Patented Oct. 26, 1943

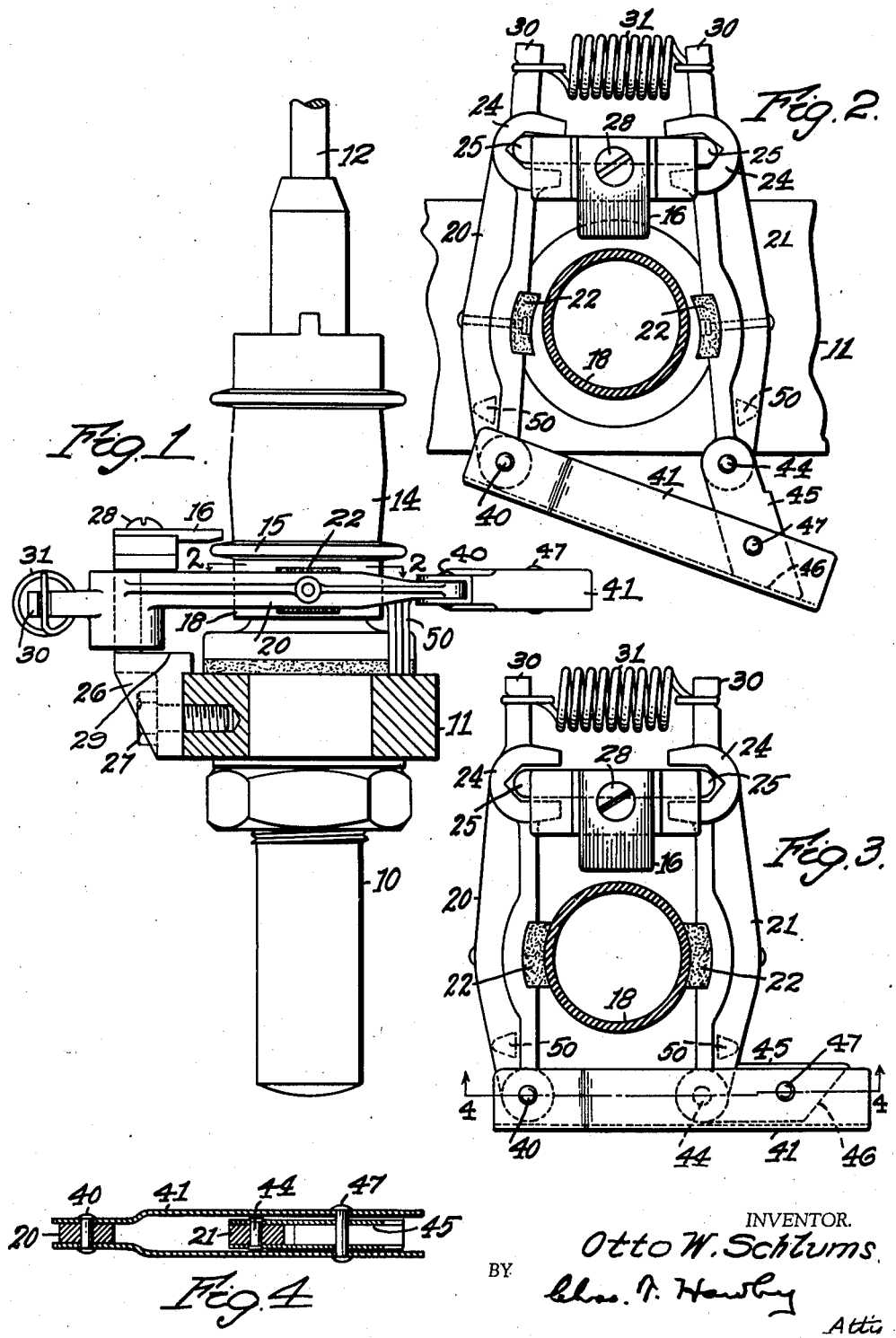

2,333,047

UNITED STATES PATENT OFFICE 2,333,047

SPINDLE BRAKE

Otto W. Schlums, Whitinsville, Mass., assignor to Whitin Machine Works, Whitinsville, Mass., a corporation of Massachusetts Application June 24, 1942, Serial No. 448,286

8 Claims. (Cl. 57—88)

This invention relates to spindles used in spinning or twisting yarn, and relates more particularly to means for stopping the rotation of such a spindle to permit piecing of a broken end or for any other desired purpose.

Spindle brakes as heretofore commonly used have applied an unbalanced braking force to the spindle in such manner that the spindle blade has frequently been bent or the bearings have been injured, particularly where ball or roller bearings were used.

It is the general object of my present invention to provide a spindle brake which will apply a balanced braking force and in such manner that the spindle will be freely self-centering during a braking operation.

My invention further relates to certain arrangements and combinations of parts which will be hereinafter described and more particularly set forth in the appended claims.

A preferred form of the invention is shown in the drawing, in which

Fig. 1 is a side elevation of a spindle having my improved brake assembled therewith;

Fig. 2 is a sectional plan view, taken along the line 2—2 in Fig. 1 and showing the brake in open or inoperative position;

Fig. 3 is a view similar to Fig. 2 but showing the brake applied; and

Fig. 4 is a detail sectional front elevation, taken along the line 4—4 in Fig. 3.

Referring to the drawing, I have indicated parts of a twister spindle comprising a base 10 mounted in the usual spindle rail 11 and a spindle blade 12 having a driving whorl 14. The lower flange 15 of the whorl 14 is held from upward displacement by the usual doffer guard 16. The whorl 14 has a cylindrical sleeve 18 extending downwardly therefrom and enclosing the upper end of the base 10.

My improved spindle brake coacts with the sleeve 18 and comprises a pair of brake levers 20 and 21 having pads 22, preferably of leather and having inner concave faces adapted to fit the outer surface of the sleeve 18. At their rear ends, the levers 20 and 21 are provided with notched or recessed portions 24 which loosely engage spaced upright portions 25 of a stand or bracket 26 which is secured to the back side of the rail 11 by a clamping screw 27. Shoulders 29 (Fig. 1) support the rear ends of the levers.

The doffer guard 16 is slidably mounted in the grooved top of the stand 26 and is secured thereto by a screw 28 extending through a slot in the guard. The extreme rear ends 30 of the levers 20 and 21 are connected by a coil tension spring 31 by which a predetermined braking pressure is applied or the levers are clamped on the parts 25.

The front end of the lever 20 is pivoted at 40 to a lever or handle 41, preferably formed of sheet metal and U-shaped in cross section. The front end of the lever 21 is pivoted at 44 to a link 45, also preferably formed of sheet metal and U-shaped in cross-section in its body portion.

The front end of the link 45 is beveled as indicated at 46 and is pivoted at 47 to the lever or handle 41. When the parts are in the position shown in Fig. 2, the beveled end 46 engages the inside of the front edge portion of the handle 41 and forms a stop to limit opening movement of the brake.

Lugs 50 extend downward from the front ends of the levers 20 and 21 and rest on the upper surface of the spindle rail 11, thus maintaining the brake at all times in approximately horizontal position.

The normal inoperative position of my improved brake is shown in Fig. 2, with the lever 41 shifted forward and with the spring 31 drawing the ends 30 together, thereby separating the pads 22 from the sleeve 18.

When it is desired to stop the spindle, the lever 41 is pushed rearward to the position shown in Fig. 3 with a reversed toggle action, which forces the pivots 40 and 44 inward relative to each other and brings the pads 22 into engagement with the sleeve 18, as shown in Fig. 3. Further movement of the reverse toggle after the pads engage the sleeve causes the levers 20 and 21 to pivot at the points of engagement of the pads with the sleeve 18, thus separating the rear ends of the levers 20 and 21 against the tension of the spring 31 until the recessed portions 24 are clear of the spaced lugs 25.

It will be noted that the pivots 40, 44 and 47 are out of alignment when the lever 41 is pushed fully rearward, thus locking the brake in the closed or operative position shown in Fig. 3 until the lever 41 is moved manually forward to release the brake.

When the parts are in the position shown in Fig. 3, the entire braking structure is free to center itself on the sleeve 18 by reason of its loose engagement with the stand 26. The braking force is thus applied equally at opposite ends of a diameter of the sleeve 18, which balances the braking pressure, and the brake is also freely self-centering with respect to the sleeve 18 as soon as braking pressure is applied.

I have thus provided an improved brake by which balanced braking pressure may be applied to a spindle and without the application of any force tending to displace the spindle with respect to its bearings, either axially or transversely.

Having thus described my invention and the details of construction thereof, I do not wish to be limited to the details herein disclosed, otherwise than as set forth in the claims, but what I claim is:

1. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite points, and means to close said levers on said braking surface, said closing means comprising a short link pivoted to the free end of one of said brake levers, and a locking lever pivoted to the free end of the other brake lever and also pivoted to said short link at a point spaced beyond the pivotal connection of said short link to said first brake lever, said short link and said locking lever constituting a reverse toggle effective to draw the free ends of said brake levers toward each other and to lock them in predetermined spaced relation.

2. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite external points, and manual means to close said levers on said braking surface, said levers being definitely positioned clear of said braking surface when open and when closed constituting a braking unit which is freely self-centering with respect to the spindle axis.

3. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite external points, manual means to close said levers on said braking surface, said levers when closed constituting a braking unit which is freely self-centering with respect to the spindle axis, and means permitting slight rotational movement only of said braking unit.

4. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite points, and manual reverse-toggle means to close and lock said levers on said braking surface.

5. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite points, manual means to close said levers on said braking surface, and a single spring effective to open said levers when said levers are unlocked and to apply a predetermined braking pressure through said levers when said levers are closed on said braking surface.

6. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite points, means to close said levers on said braking surface, and positioning means closely clamped by said levers when open and loosely engaged by said levers when closed on said braking surface, whereby said levers are self-centering with respect to the spindle axis when operative.

7. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite points, spring means to yieldingly draw the rear ends of said levers toward each other, and manual means to move the front ends of said levers toward each other to produce a braking action and also to effect pivotal movement of said levers about the points of contact of said levers with said braking surface and to thereby increase the yielding pressure of said braking levers on said surface.

8. In a spinning or twisting machine having a spindle rail and a plurality of spindles rotatably mounted thereon, in combination, a whorl for each spindle having a rotational braking surface, a pair of brake levers effective to simultaneously apply braking pressure to said braking surface at diametrically opposite points, spring means to yieldingly draw the rear ends of said levers toward each other, and manual means to move the front ends of said levers toward each other to produce a braking action and also to effect pivotal movement of said levers about the points of contact of said levers with said braking surface and to thereby apply a predetermined braking pressure on said surface.

OTTO W. SCHLUMS.